United States Patent
Crighton

(10) Patent No.: US 6,330,570 B1
(45) Date of Patent: Dec. 11, 2001

(54) DATA BACKUP SYSTEM

(75) Inventor: Ian Peter Crighton, Bristol (GB)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/259,129

(22) Filed: Feb. 26, 1999

(30) Foreign Application Priority Data

Mar. 2, 1998 (EP) .................................................. 98301498

(51) Int. Cl.[7] ............................. G06F 17/30; G06F 12/00
(52) U.S. Cl. ........................................................... 707/204
(58) Field of Search .......................... 707/204; 714/100; 711/100

(56) References Cited

U.S. PATENT DOCUMENTS

| | | | |
|---|---|---|---|
| 4,634,110 | * | 1/1987 | Julich et al. ............................. 371/11 |
| 5,212,772 | * | 5/1993 | Masters ................................... 395/200 |
| 5,680,617 | * | 10/1997 | Gough et al. ............................ 395/615 |
| 5,758,067 | * | 5/1998 | Makinen et al. .................. 395/185.07 |
| 5,875,478 | * | 2/1999 | Blumemau ............................. 711/162 |
| 6,038,379 | * | 3/2000 | Fletcher et al. ..................... 395/200.6 |
| 6,058,494 | * | 5/2000 | Gold et al. ............................... 714/42 |
| 6,263,454 | * | 7/2001 | Gold et al. ............................... 714/25 |

FOREIGN PATENT DOCUMENTS 2274180A   12/1992  (GB)  ......................................  13/10

OTHER PUBLICATIONS

Central Point PC Tools, Central Point Software, Inc., part 1, p. 30, 32, 40.*
European Search Report, EP 98 30 1498, Jul. 30, 1998.
Fujitsu Scientific & Technical Journal, Spec. Issue, Jun., No. 1, K. Suzuki et al., "Storage Management Software for Mainframe and UNIX".
IBM Technical Disclosure Bulletin, vol. 35, No. 2, Jul. 1992, "Automatic Backup of User Data".

* cited by examiner

Primary Examiner—John Breene
Assistant Examiner—Susan Rayyan

(57) ABSTRACT

A backup system includes backup application software operating on a host computer, which is configurable to store data to be backed up to a backup apparatus. The system is configurable to schedule and enact a pre-backup check, prior to running the actual scheduled backup job so that any faults which have developed since the initial configuration can be remedied. The pre-backup check preferably occurs on a daily basis prior to every scheduled backup job.

15 Claims, 4 Drawing Sheets

DATA BACKUP SYSTEM

TECHNICAL FIELD

The present invention relates to data backup systems, and particularly to increasing the reliability of data backup systems.

BACKGROUND ART

When a pre-defined set of data, or 'data set', is to be transferred from a host system's internal mass storage, such as a hard disk, to a secondary backup device, such as a tape drive, the procedure is known as a 'backup job'. In most known backup application software packages there are two basic methods by which such a backup job may be initiated; manually or scheduled.

In the case of manual backup, an operator enacts the backup by executing backup application software on the host system, which operates immediately to backup selected, stored data files to, for example, tape.

When a backup job is scheduled, an operator executes the backup application software and configures software to run the backup job at a pre-defined time, such as 'every night at midnight' or 'every Friday at 1:00 am', or, in general, when the data to be backed up is not being accessed by anyone. From the moment that the job is set up, the backup software sits substantially idle until the backup date and time arrives. At this point, the software establishes communications with the backup device, for example over an interface and connecting bus (e.g. SCSI), and then transfers the data.

At the point that the host system starts to actually run the backup job, the process of completing the job may be prone to failure for many different reasons. These might include:

- a communications error such as a software driver becoming corrupted or deactivated;
- a connectivity problem such as the backup device has its data communications path broken (e.g. the SCSI cable has been unplugged);
- the backup device is powered off (e.g. somebody has accidentally pulled out the mains cable);
- a hardware failure in the backup device;
- the backup medium is not present (e.g. the tape has been taken out); or
- the backup medium cannot be written to (e.g. it is write-protected, worn out or full).

If one of these errors occurs, then the backup job will not be completed and the operator will typically not know about it until he observes an error message on the host system console, usually first thing the following morning. By the time the operator reads the message, no backup job has been run successfully and the system's data has been left unprotected. It is then too late to start another backup job as the system is now in use for everyday work tasks.

DISCLOSURE OF THE INVENTION

The present inventors, in appreciating the potential serious implications of a failed backup job, have developed an effective solution, to be described below, which substantially reduces the risk of a backup job failing.

As such, according to one aspect, the present invention provides a backup system configurable to enact a pre-backup check, to verify that a proposed backup job can be completed, in advance of enacting the proposed backup job, the system comprising means to produce a warning message in the event of a determination that there is a likelihood that the proposed backup job will not complete successfully.

Such a system greatly reduces the risk of a backup job failing, by instigating the pre-backup check. Within the meaning of the present description, any backup checks that happen automatically as part of a backup job, at substantially the same time as the backup job, would not be classed as a pre-backup check.

The pre-backup check may verify that data can be written to specified backup apparatus. Verification for this purpose might be achieved by simply signalling to the backup apparatus, for example using a SCSI 'test unit ready' command. If the backup apparatus responds with the correct signal, then the backup system assumes that the backup apparatus is operational. If the backup apparatus responds with an unexpected signal, or does not respond at all, then the backup system assumes that the backup apparatus will not operate correctly, and, as a result, generates a warning message. An alternative approach to verify the correct operation of the backup apparatus would be to attempt writing some data to the backup apparatus and media.

Additionally, or alternatively, the pre-backup check may verify that data forming at east part of the defined data set can be accessed by the system. For this, the backup system might select, for example, one data file from the defined data set and attempt to access that file. Successful access leads the backup system to assume that file system access is possible.

In one embodiment, for the pre-backup check, the system may enact a relatively small portion of the proposed backup job in order to verify that the proposed backup job may be completed successfully. For example, if the proposed backup job is defined to back up a large number of data files, the check might involve reading one of the files defined by the data set and writing the file to the backup device, such as a tape drive. In this way, the communications channels between both the file system and the backup apparatus are checked. A failure in reading the file, or writing the file to the backup apparatus, triggers a warning message. Alternatively, rather than reading a whole file, the check might involve reading a small part of a file, particularly when files can be large.

The pre-backup check and the proposed backup job can, preferably, both be scheduled. In a typical scenario, the pre-backup check would be scheduled to operate as late as possible in the working day, for example just before the time an operator is due to leave work in the evening. The actual backup job would typically be scheduled to occur at a time when no computer operators would be expected to be at work, for example at 1:00 am in the morning. Thus, failure at the pre-backup check stage would warn the operator, before he goes home, to take remedial action in order to ensure that the backup job at 1:00 am is able to complete successfully.

The pre-backup check may be schedulable to occur in advance of at least one scheduled instance of the proposed backup job. In this case, for example, a pre-backup check could be scheduled to occur before at least one scheduled backup, where the backup job might be scheduled to happen each day at 1:00 am.

In a preferred embodiment, however, the pre-backup check can be scheduled to occur in advance of every scheduled instance of the proposed backup job. Thus, for minimum risk, the pre-backup check would be carried out every day before every backup job.

The pre-backup check may include the step of estimating the required capacity of backup media for the proposed backup job. In particular, the pre-backup check may estimate the required capacity on the basis of previous, completed backup jobs.

In a preferred embodiment to be described, the backup system typically comprises a host computer running application software operative to provide a graphical user interface (GUI) having backup operator-configurable options which allow a backup operator to configure the independent operation of both the pre-backup check and the proposed backup job.

In a preferred embodiment to be described, the backup system also typically provides a graphical warning message in the event the pre-backup check determines that a backup job may not complete successfully.

In an alternative embodiment, the backup system provides a graphical warning message on a remote computer terminal in the event the pre-backup check determines that a backup job may not complete successfully.

The present invention also provides method of backing up data, comprising the steps of:

scheduling a backup system to enact a pre-backup check to verify that a proposed backup job can be completed;

scheduling a backup system to enact a backup job to occur at a time after the pre-backup check;

generating a warning message in the event the pre-backup check determines that there is likelihood that the backup job will not be successful.

Other aspects and embodiments of the present invention are described and claimed hereunder.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

BEST MODE FOR CARRYING OUT THE INVENTION, & INDUSTRIAL APPLICABILITY

There will now be described by way of example only the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
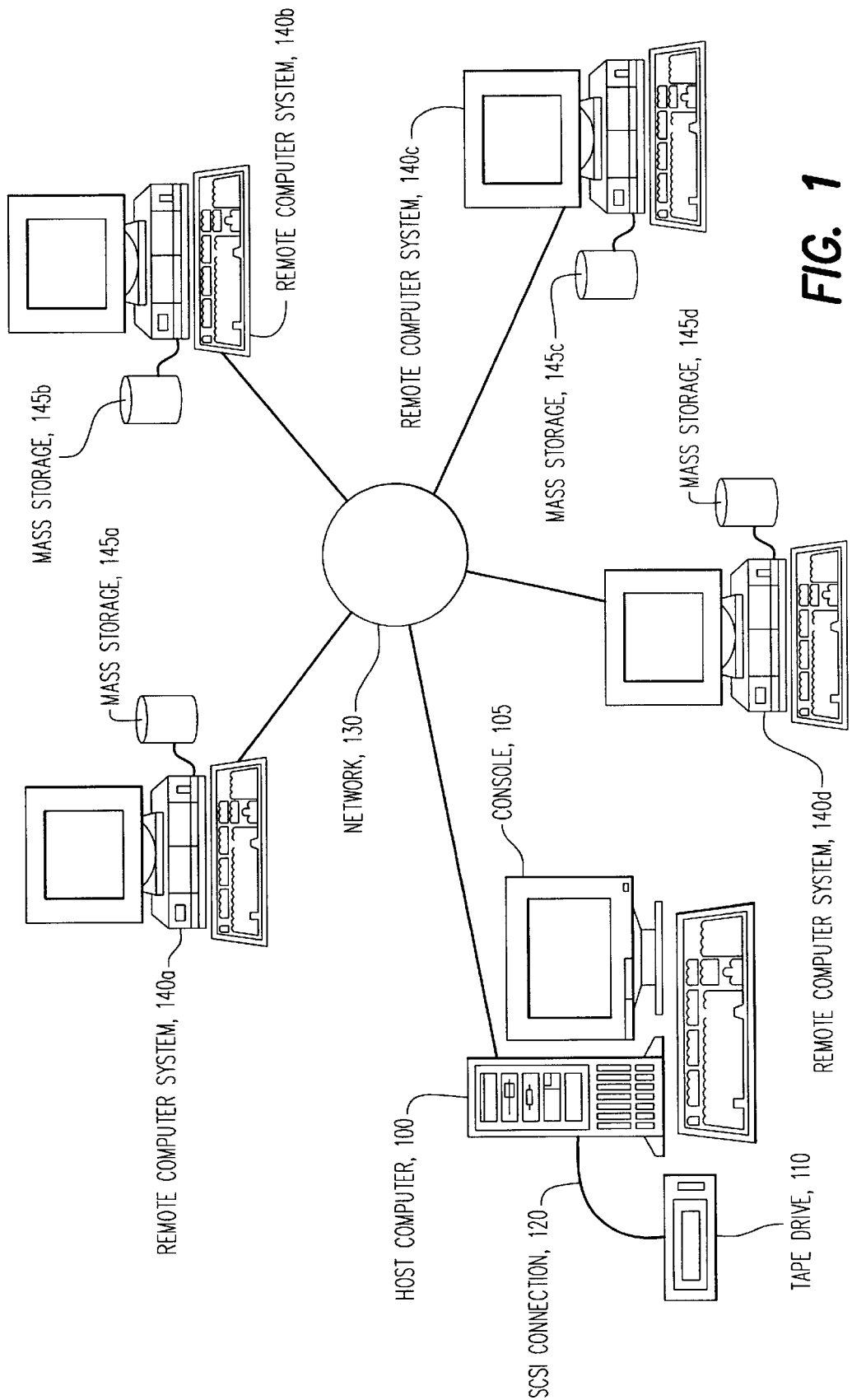
FIG. 1, is a block diagram showing the backup system in an exemplary operating environment.

FIG. 1 illustrates an exemplary operating environment in which an embodiment of the present invention may operate.

In FIG. 1, a host computer system 100 is connected to backup apparatus, which in this case is a tape drive 110, via a SCSI connection 120. The host computer 100 has a console 105 and is also connected via a network 130 to a number of remote computer systems, 140a to 140d, each having mass storage, 145a to 145d, in the form of a hard disk. The overall system operates under the control of the Microsoft NT operating system, but could equally run under the control of any other operating system.

The host computer 100 includes backup application software, which is configured to operate as will now be described with reference to the flow diagram in FIG. 2.

Figure 2:
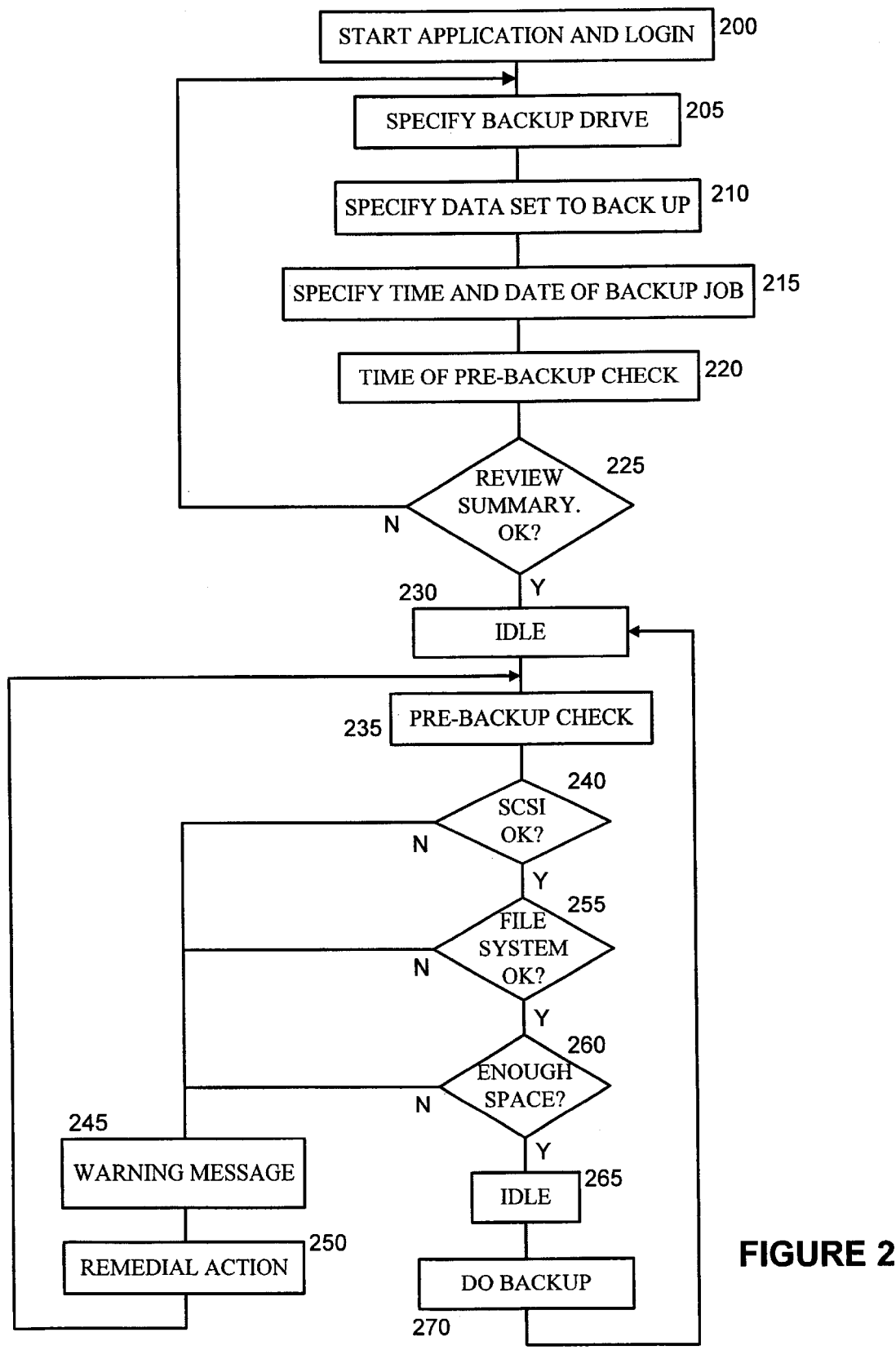
FIG. 2 is a flow diagram which represents the steps involved with setting up and enacting a pre-backup check and a backup job.

With reference to FIG. 2, in step 200, a backup operator starts the backup application software running on the host computer 100, in response to which the backup application software generates a GUI. The GUI initially displays a window to give the backup operator the opportunity to log onto the host computer 100. The backup operator enters his identity and password to gain access to the system. After the operator has gained access, the GUI displays a window, in step 205, which allows the backup operator to define the type and location the tape drive 110. In step 210, the GUI displays a window, which allows the backup operator to define the data set, by selecting the directories and/or disk volumes that he would like to back up. Further details of this step, in particular how the system prevents the selection of too much data for backing up, are provided below.

Figure 3:
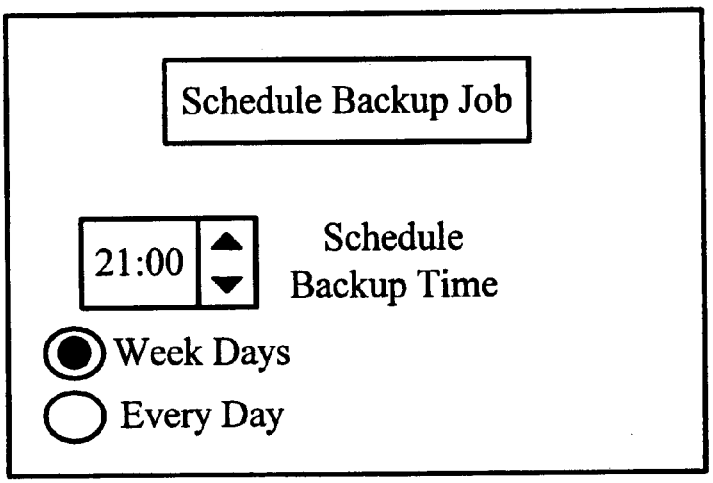
FIG. 3, is a screen image of a GUI suitable for scheduling a backup job in accordance with the present embodiment.

In step 215, the GUI displays the next window, which allows the backup operator to specify the times and dates for the proposed backup job. An exemplary display is shown in FIG. 3. As shown in FIG. 3, the backup operator can set the time to start the backup, and can specify whether the backup should happen on a daily basis or only on week days.

Figure 4:
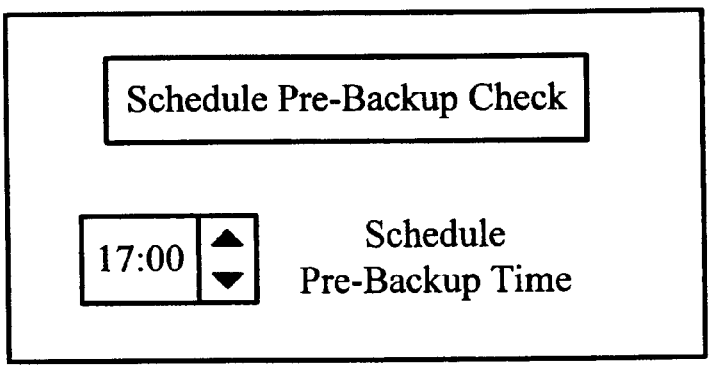
FIG. 4, is a screen image of a GUI suitable for scheduling a pre-backup check in accordance with the present embodiment.

In step 220, the GUI displays a further window, which allows the backup operator to specify at what time of day he would like the pre-backup check to operate. An exemplary display is illustrated in FIG. 4. As shown in FIG. 4, the time is set to 17:00, which is nearing the time when the backup operator might normally wish to go home. The later in the day this time is set for, the lower the risk that, between this time and the actual backup job time, a new problem will be encountered.

In step 225, the GUI displays a window, which summarises the details of the scheduled backup job, and pre-backup check details. At this point, the backup system is set up for operation. Also at this point, the system may enact certain checks, for example to see if the tape drive 110 is attached to the host computer 100 correctly. If the operator is not happy with the setup, or there is a problem with, for example, the tape drive 110, the system jumps back to step 205, where the setup routine can be re-enacted.

In step 230, the backup application software sits idle until the pre-backup time is reached.

In step 235, when the pre-backup time is reached, the pre-backup check begins. In step 240, the integrity of the SCSI connection between the host computer 100 and the tape drive 110 is checked. This is achieved by transmitting a SCSI 'Test Unit Ready' command to the tape drive 110. If the status "GOOD" is received, the pre-backup check continues. Otherwise, the application software assumes that there is a problem with either the connection to the tape drive, the tape drive itself or the media. For example, the tape drive may be disconnected, there may be no tape present in the drive or the tape may be write-protected, etc. As a result of encountering a problem, the application software generates a graphical warning message, in step 245, which is displayed on the console 105 of the host computer 100. Hereafter, the backup operator will need to take the appropriate remedial action, in step 250, before the application software can be set to re-run the pre-backup check at step 235.

In step 255, once the tape drive is operating correctly, the application software checks the status of the selected directories and/or volumes selected for backup in the backup job. This is achieved by attempting to read at least one file from each selected directory and/or volume. If any selected file is found to be inaccessible, the application software generates a graphical warning message, in step 245, which is displayed on the console 105 of the host computer 100. The backup operator will need to take remedial action, in step 250, before the application software can be set to re-run the pre-backup check at step 235.

Once it has been established that data can be read from the file system and written to tape, the application software carries out a further check, in step 260, to establish whether there is enough space on the tape for the specified backup job. A preferred means of estimating the size of the backup job will be described below. If there is a problem with the tape capacity, the backup operator will need to take remedial action, in step 250, before the application software can be set to re-run the pre-backup check at step 235.

In step 265, the application software sits substantially idle until the scheduled time of the backup job. In step 270, the backup job initiates at the scheduled time.

The pre-backup check and the backup job will repeat on a daily basis as specified in the setup procedure outlined above.

The method used for estimating the size of the backup job will now be considered in more detail.

When using scheduled backup jobs to transfer data from a host computer's internal mass storage to a secondary backup device such as a tape drive, there is always the danger that the size of the data set to be backed up may exceed the size of the backup medium. If this occurs, then there are two possible outcomes:

the data overflows the tape and the backup application software requests that a second tape be loaded into the drive, which is known as tape spanning; and the data overflows the tape and the backup application software aborts the backup job. It then marks the incomplete session on the tape as effectively never having been written.

Tape spanning in itself is believed to be not very useful, as in most situations there is nobody present to change the tape at the time that it needs changing, for example in the middle of the night. So, when this occurs unexpectedly, the operator typically will only find out that the tape needs changing first thing in the morning. By then it is too late to resume the backup job as the system is now in use for everyday work tasks.

Normally, there are two opportunities for the size of the data set to go unnoticed by the backup operator:

at the time the scheduled job is set up by the backup operator (which is typically done only once), he is unaware of the actual capacity of the backup medium (the view of the medium's capacity may also be complicated by the use of data compression where the compressibility of the data is unknown); and at the time the backup job actually runs, the previously defined data-set may have grown in size (possibly over several days) to the extent that it will now not fit on the backup medium.

The applicants have developed a particularly convenient method to prevent data overflow. The system uses a remaining capacity indicator function available on most SCSI backup devices, that gives the true size of the available free space on the currently loaded medium, along with calculated data compression statistics, derived from either hardware compression-capable backup devices, or from the application software's own statistics, in the case of software compression.

In accordance with the present embodiment, a workable data compression estimate is derived from a rolling window of historical data compression ratios from previous, successfully completed backup jobs. Typically, this estimate becomes more refined with each successive backup job. Initially, when there is no history, the calculation assumes a default ratio of, say, 2:1.

On the basis of these statistics, the backup application software can alert the backup operator to a potential data overflow situation, as will now be described.

Figure 5:
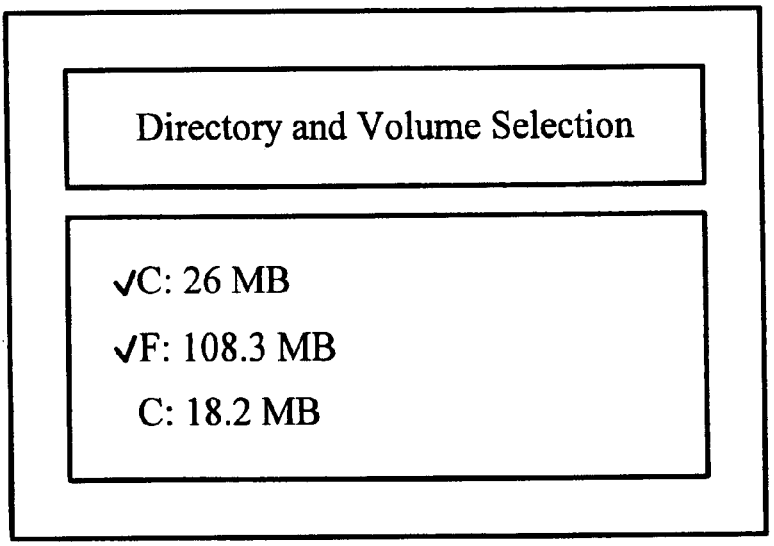
FIG. 5, is a screen image of a GUI suitable for specifying the data set for a backup job.

The first opportunity to carry out a capacity check is when the operator is setting up the backup job, for example at step 210 or step 225 in FIG. 2. In accordance with the present embodiment, the software operates by disallowing the selection of too much data by the backup operator. The backup operator selects from the volumes that are displayed in the appropriate GUI window. Such a window is shown in FIG. 5. If the volume size would exceed the backup medium capacity, using the derived capacity measure, then the volume is prevented from being selected.

Additionally, if the total data-set size exceeds a certain percentage of the backup medium capacity (say, 90%) then an additional warning is triggered (not shown) that says: "The data-set selected is likely to exceed the tape capacity in the very near future. You may wish to select less volumes to be backed up".

The next opportunity for checking the size of the backup job is as part of the pre-backup check, in step 260 of FIG. 2, which happens before every backup job to ensure that the data will fit onto the medium. This check happens on a daily basis and, as such, provides pre-warming that soon the (remaining) tape capacity might not be sufficient.

Essentially, the pre-backup capacity check performs a calculation to ensure that the data will fit onto the medium. This calculation takes into account the actual data-set size, as it is likely to have grown since the backup job was originally defined, the data compression rolling average for the data set, derived from previous jobs (as defined above), and the actual space available on the medium, as previous backup jobs will have reduced the capacity (in the case of an append rather than an overwrite backup job).

If the calculation shows that the backup medium capacity is likely to be exceeded, then the backup application software generates a graphical warning message in the system console 105 that the backup operator should re-configure the backup job to backup less data, or change the tape. Additionally, or alternatively, the backup operator may be advised to consider the purchase of a higher capacity backup device. As this warning is given at the pre-backup check time, the operator will still be on hand and can rectify the situation before the backup fails.

Figure 6:
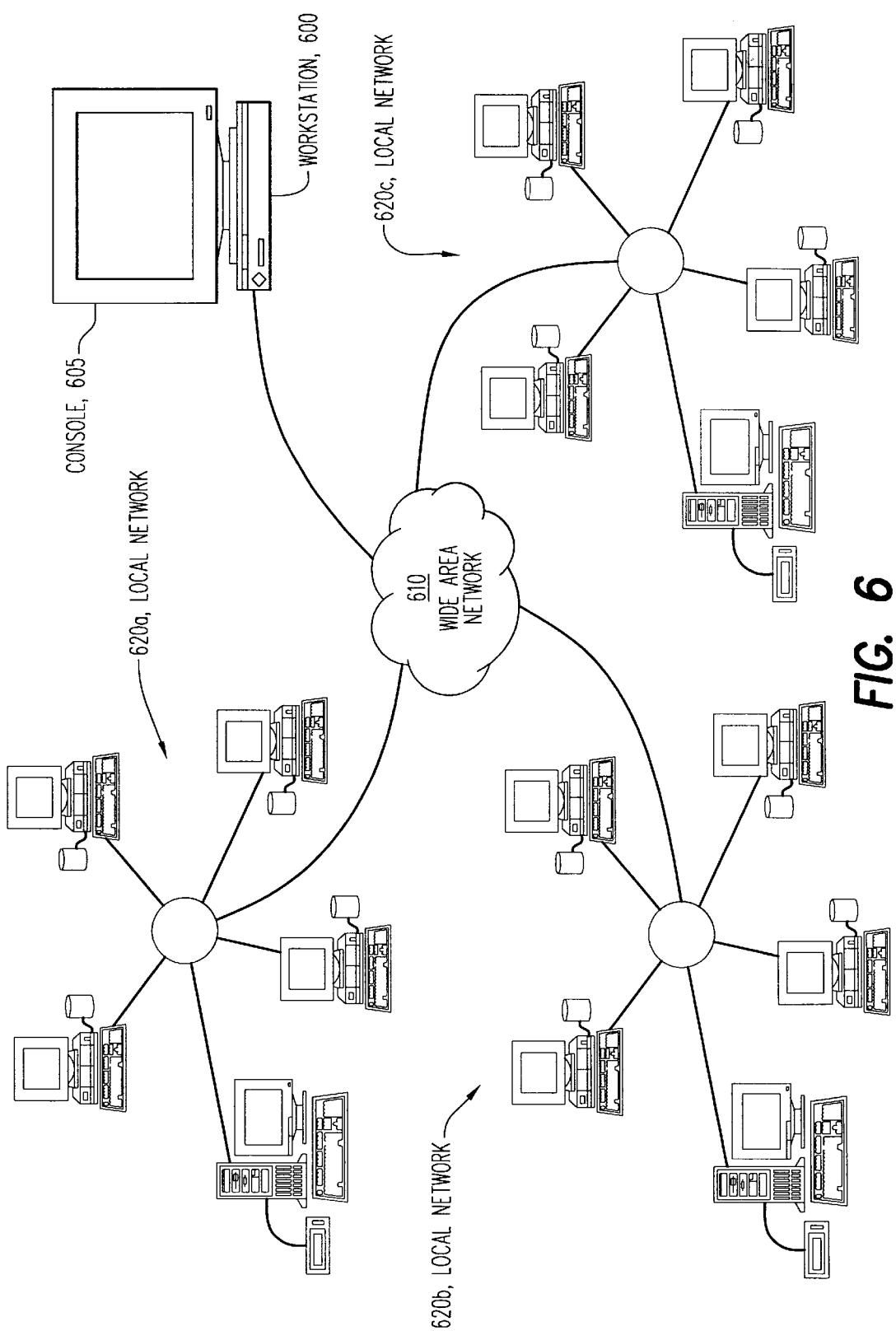
FIG. 6 is a block diagram showing an alternative embodiment of the system, in which the warning messages are forwarded to an enterprise network terminal.

An adaptation of the embodiment described above is shown in FIG. 6. The backup application software, additionally or alternatively, is configured to generate network messages, which are recognised by enterprise network management systems such as Hewlett-Packard Company's "OpenView" system, or Computer Associates' "Unicenter" system. In FIG. 6, local networks, 620a–620c, each of which is substantially as described with reference to FIG. 1, have a host computer system which further transmits any warning messages to the console 605 of an enterprise network workstation 600, via a large area network 610. In this scenario, a single operator, at the workstation 600, can monitor whether all pre-backup checks successfully complete.

What is claimed is:

1. A backup system configurable to enact a pre-backup check, to verify that a proposed backup job can be completed, in advance of enacting the proposed backup job, the system comprising:

means to produce a warning message in the event of a determination that there is a likelihood that the proposed backup job will not complete successfully.

2. A back up system according to claim 1, wherein the pre-backup check verifies that data can be written to a specified backup apparatus.

3. A backup system according to claim 1, wherein the pre-backup check verifies that data forming at least part of a defined data set can be accessed by the system.

4. A backup system according to claim 1, wherein, for the pre-backup check, the system enacts a relatively small portion of the proposed backup job in order to verify that the proposed backup job may be completed successfully.

5. A backup system according to claim 1, wherein the pre-backup check and the proposed backup job can both be scheduled.

6. A backup system according to claim 1, wherein the pre-backup check can be scheduled to occur in advance of at least one scheduled instance of the proposed backup job.

7. A backup system according to claim 1, wherein the pre-backup check can be scheduled to occur in advance of every scheduled instance of the proposed backup job.

8. A backup system according to claim 1, wherein the pre-backup check includes estimating the capacity of backup media required for the proposed backup job.

9. A backup system according to claim 8, wherein the pre-backup check estimates the capacity on the basis of one or more previously successfully completed backup jobs.

10. A backup system according to claim 1, comprising application software operative to run on a host computer to provide a graphical user interface having user configurable input options to allow a user to configure independent operation of both a pre-backup check and a proposed backup job.

11. A backup system according to claim 1, comprising application software operative to run on a host computer to provide a graphical warning message in the event a pre-backup check determines that a backup job may not complete successfully.

12. A backup system according to claim 1, comprising application software operative to run on a host computer to provide a graphical warning message on a remote computer terminal in the event a pre-backup check determines that a backup job may not complete successfully.

13. A method of backing up data, comprising the steps of:

scheduling a backup system to enact a pre-backup check to verify that a proposed backup job can be completed;

scheduling a backup system to enact a backup job to occur at a time after the pre-backup check;

generating a warning message in the event the pre-backup check determines that there is likelihood that the backup job will not be successful.

14. A method according to claim 13, wherein the pre-backup check is scheduled to take place near the end of the working day, while an operator is likely to still be present.

15. A method according to claim 13, wherein the pre-backup check is scheduled to occur at least one hour before the backup job.

\* \* \* \* \*